UNITED STATES PATENT OFFICE.

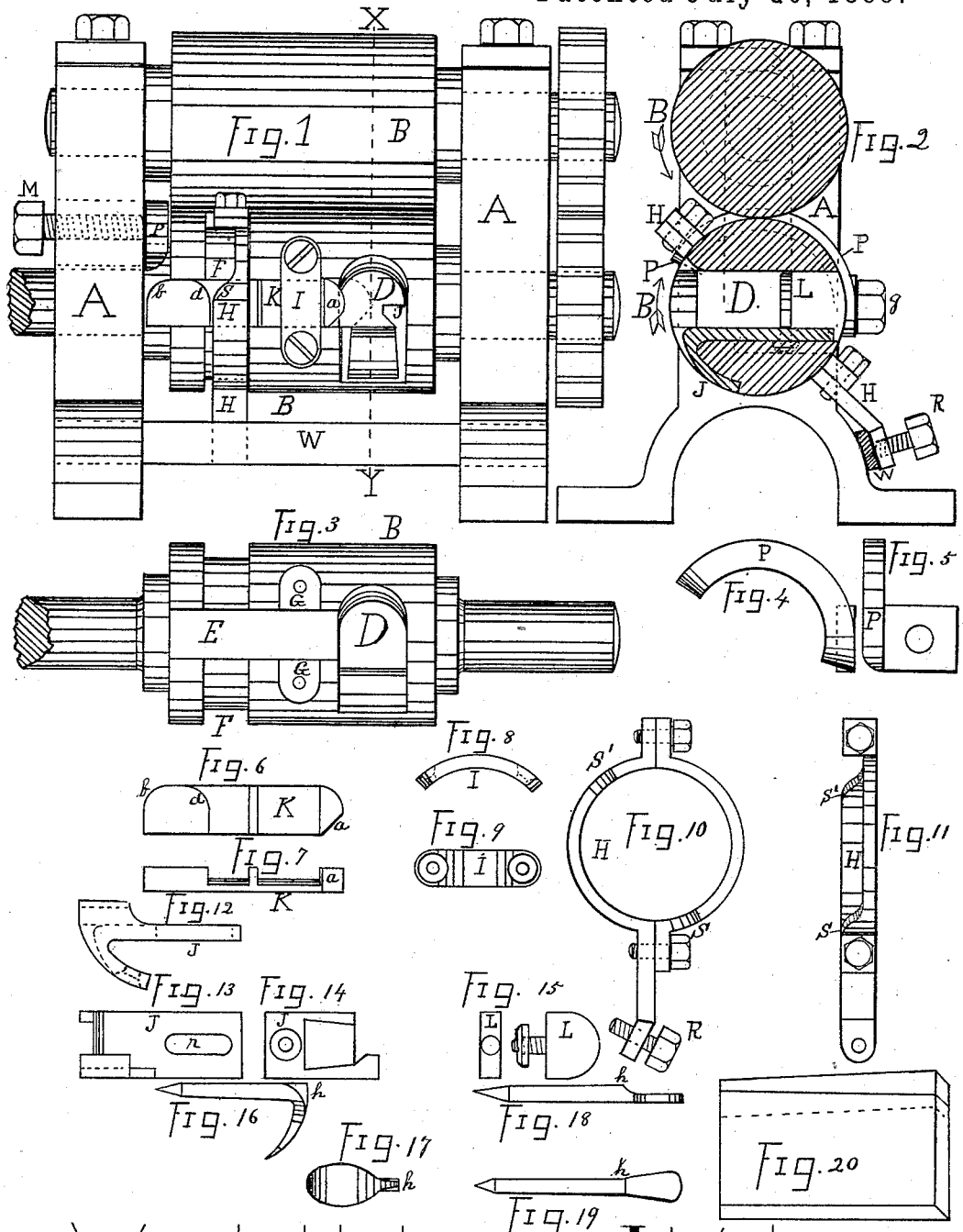

HENRY LILLEY, OF PHILADELPHIA, PENNSYLVANIA, ASSIGNOR TO LILLEY & HILLSLEY, OF SAME PLACE.

MACHINE FOR MAKING PLUMBERS' HOOKS.

SPECIFICATION forming part of Letters Patent No. 408,184, dated July 30, 1889.

Application filed May 6, 1889. Serial No. 309,793. (No model.)

*To all whom it may concern:*

Be it known that I, HENRY LILLEY, a citizen of the United States, residing at Philadelphia, in the county of Philadelphia and State of Pennsylvania, have invented certain new and useful Improvements in Machines for Making Plumbers' Hooks; and I do hereby declare that the following is a full, clear, and exact description of the invention, which will enable others skilled in the art to which it appertains to make and use the same.

My invention relates to machines for turning and rolling flat the hook end of pipe-hooks.

The improvement consists, first, in a pair of rollers, the bottom one having a transverse opening, in which is fitted a die transverse and below the center; second, a pair of rolls, the bottom one fitted with a die and sliding bar, and two fixed cams, which cams operate the sliding bar, all as will be hereinafter described, referring to the annexed drawings, making a part of this specification, in which—

Figure 1 is a front view of a machine constructed according to my invention. Fig. 2 is a sectional end view taken on the line X Y of Fig. 1. Figs. 3 to and including Fig. 15 are parts shown detached from the machine. Figs. 16, 17, 18, 19, and 20 show the pipe-hook in the various stages of construction.

Similar letters refer to similar parts throughout the several views.

The construction of my improved machine is as follows:

A represents the housings in which the rolls B are operated. The rolls may be cast in iron or steel. The top one is a plain roll, and I prefer it to be a "chilled roll." The bottom roll is constructed as shown in Fig. 3, provided with a transverse hole D, longitudinal groove E, and circular grooves F and G. The hole D is cut away more on one side of the center than the other, as shown in Figs. 2 and 3. This is of importance, as a properly-shaped hook cannot be made unless the die is so placed below the transverse center line.

J is a steel die made in shape shown in Figs. 12, 13, and 14. In this die is made a slot *r*. In this slot is adjusted and fastened the stop L. The die J is fastened in the roll by a countersunk screw.

K is a steel bar made to slide in the groove E. The bar K is provided at the right-hand end with head *a*. At the left-hand end it is rounded to form cam-heads *b* and *d*. The bar K is kept in the groove E by straps I and H. The groove E may be planed dovetail on the sides, the bar K made to fit, sliding into the groove from the end, and the strap I dispensed with.

The strap H is constructed as shown in Figs. 10 and 11. This strap is made in two parts, as shown in Fig. 10, and put together by "tap-screws." A portion of the strap H is cut away, so as to form cams S S'. At the lower end of strap H is an adjusting-screw R. This screw rests against a bar W, fastened to the housings A.

P is a fixed cam made in shape shown in Figs. 4 and 5. It is fastened to one of the housings A by the tap-screw *g*.

M is a regulating-screw screwed in the housing A and pressing the free end of cam P, and by which it may be adjusted to more or less close the jaws formed by the die J and head *a* on bar K.

To roll a class of hooks shown in Figs. 16 and 17, the blanks are first cut from a red-hot plate, Fig. 20, by a machine such as used to cut large nails. As the blank is cut from the plate, and while hot, it is caught by a heading-die and flattened at one end and pointed at the other, in shape as shown in Figs. 18 and 19, and in which shape they leave the cutting-machine. These blanks, as shown in Figs. 18 and 19, are heated a bright-red heat. They are taken from the fire by tongs and inserted in the hole D, pushing the point against the stop L, (it being adjusted for the length.) As the rolls move in direction of the arrows, the bar K will come against the fixed cam P and force the bar K to the right, closing the jaws formed by the head *a* and die J, grasp the blank at the heel *h*, and it, being hot, will be pressed into a shape shown at *h*, Figs. 16 and 17, and as the head of the hook passes under the top roll it will be flattened and turned to a shape as shown in Figs. 16 and 17. As the head *b* of bar K leaves the fixed cam P, the cam *d* on bar K will come against the cam S' on strap H and open the jaws *a* and J, and as the bottom roll turns down the hook just made will drop out, and the jaws are open for another blank.

I describe my machine as being fed by hand; but an automatic feeder may be applied consisting of a trough and automatic pusher. The hot blanks are by tongs transferred from the fire by hand and laid in the trough and pushed in the hole D just as the hole passes the trough.

My improved hook-rolling machine is principally intended for making a class of pipe-hooks having a flat "duck-bill" head, such as shown in Figs. 16 and 17; but it is obvious the machine may be provided with dies and make other-shaped hooks.

Having as above fully described my invention, what I claim is—

1. In a machine for rolling pipe-hooks, a pair of rolls mounted in a pair of housings, the lower roll constructed with a transverse opening D, in which is fixed a die J below the transverse center of the roll, as shown, and for the purpose specified.

2. The combination of die J, sliding bar K, band-cam H, fixed cam P, rolls B, and housings A, all substantially as shown and described.

HENRY LILLEY.

Witnesses:
JOHN SHINN,
THEO. M. HILLSLEY.